United States Patent
Sacks et al.

(10) Patent No.: US 9,130,351 B2
(45) Date of Patent: Sep. 8, 2015

(54) MODULATION OF FIBER LASER PUMPED DIFFERENCE FREQUENCY GENERATOR

(75) Inventors: Zachary Sacks, Modiin (IL); Doron Chomsky, Rehovot (IL); Dov Abramovich, Tel-Aviv (IL); Doron David, Ge'a (IL)

(73) Assignee: ELBIT SYSTEMS ELECTRO-OPTICS ELOP LTD., Rehovot (IL)

( * ) Notice: Subject to any disclaimer, the term of this patent is extended or adjusted under 35 U.S.C. 154(b) by 881 days.

(21) Appl. No.: 13/125,110

(22) PCT Filed: Dec. 7, 2009

(86) PCT No.: PCT/US2009/066955
§ 371 (c)(1),
(2), (4) Date: Jul. 7, 2011

(87) PCT Pub. No.: WO2010/063034
PCT Pub. Date: Jun. 3, 2010

(65) Prior Publication Data
US 2011/0261440 A1    Oct. 27, 2011

(30) Foreign Application Priority Data

Nov. 2, 2008   (IL) .......................................... 195050

(51) Int. Cl.
*H01S 3/23* (2006.01)
*G02F 1/35* (2006.01)
(Continued)

(52) U.S. Cl.
CPC ............ *H01S 3/2308* (2013.01); *G02F 1/3515* (2013.01); *G02F 1/3534* (2013.01); *G02F 1/39* (2013.01); *H01S 3/094076* (2013.01); *H01S 3/10015* (2013.01); *H01S 3/06758* (2013.01)

(58) Field of Classification Search
CPC ....................................................... H01S 3/2308
USPC ............................................................. 372/6
See application file for complete search history.

(56) References Cited

U.S. PATENT DOCUMENTS 5,291,326 A * 3/1994 Heidemann .................... 398/33
5,412,674 A * 5/1995 Scheps ............................ 372/22
(Continued)

FOREIGN PATENT DOCUMENTS

EP    1 113 540    7/2001
EP    1 947 506    7/2008

OTHER PUBLICATIONS

International Search Report of the International Searching Authority (ISA/KR) dated Jul. 1, 2010 and Written Opinion for the corresponding PCT application No. PCT/US2009/066955.
(Continued)

*Primary Examiner* — Ari M Diacou
(74) *Attorney, Agent, or Firm* — Pearl Cohen Zedek Latzer Baratz LLP

(57) ABSTRACT

Systems and methods for modulating the output of a difference frequency generator such as an OPO, OPA or OPG include a pump fiber laser having at least one internal, directly modulatible component, wherein the pump fiber laser produces a pump signal, and a difference frequency generator coupled to the pump fiber laser. The difference frequency generator is configured for accepting the pump signal of the pump fiber laser and producing an output signal, wherein parameters of the output signal are determined based on direct modulation of the internal, directly modulatible component of the pump fiber laser.

18 Claims, 4 Drawing Sheets

(51) Int. Cl.
*G02F 1/39* (2006.01)
*H01S 3/094* (2006.01)
*H01S 3/10* (2006.01)
*H01S 3/067* (2006.01)

(56) References Cited

U.S. PATENT DOCUMENTS

| | | | |
|---|---|---|---|
| 5,909,306 A * | 6/1999 | Goldberg et al. | 359/337.1 |
| 5,912,910 A * | 6/1999 | Sanders et al. | 372/22 |
| 6,058,126 A | 5/2000 | Ishikawa et al. | |
| 6,181,463 B1 * | 1/2001 | Galvanauskas et al. | 359/330 |
| 6,229,828 B1 * | 5/2001 | Sanders et al. | 372/22 |
| 6,738,397 B2 | 5/2004 | Yamamoto et al. | |
| 6,774,881 B2 * | 8/2004 | Karakawa | 345/84 |
| 6,940,877 B2 | 9/2005 | Hu et al. | |
| 7,054,339 B1 | 5/2006 | Hu et al. | |
| 7,391,795 B2 | 6/2008 | Yumoto et al. | |
| 7,872,794 B1 * | 1/2011 | Minelly et al. | 359/341.31 |
| 7,876,803 B1 * | 1/2011 | Di Teodoro et al. | 372/94 |
| 8,111,451 B2 * | 2/2012 | Starodubov et al. | 359/326 |
| 2005/0157760 A1 * | 7/2005 | Rice et al. | 372/6 |
| 2005/0238070 A1 * | 10/2005 | Imeshev et al. | 372/21 |
| 2008/0291963 A1 * | 11/2008 | Deaton et al. | 372/69 |
| 2009/0107962 A1 * | 4/2009 | Munroe et al. | 219/121.67 |

OTHER PUBLICATIONS

Creeden et al., "Compact, high average power, fiber-pumped terahertz source for active real-time imaging of concealed objects", Optics Exprss, vol. 15, No. 10, May 2007, p. 6478, XP55010154, ISSN: 1094-4087, DOI: 10.1364/OE.15/006478 p. 6478-p. 6482; figures 1-2.
Extended European Search Report dated Mar. 27, 2012 for the corresponding European patent Application No. 09829852.4.
Hongjun Liu et al: "Compact tunable high power picosecond source based on Yb-doped fiber amplification of gain switch laser diode", Optics Express, vol. 16, No. 11, pp. 7888-7893, May 26, 2008.
Lindsay et al: "Singly-resonant optical parametric oscillators with pump-modulation transfer for frequency-modulated spectroscopy in the mid-infrared", Proceedings of SPIE, vol. 6455, pp. 64550P-64550P-7, Feb. 8, 2007.
Summons to Attend Oral Proceedings for European Patent Application No. 09829852.4 pursuant to Rule 115(1) EPC dated Apr. 7, 2015.

* cited by examiner

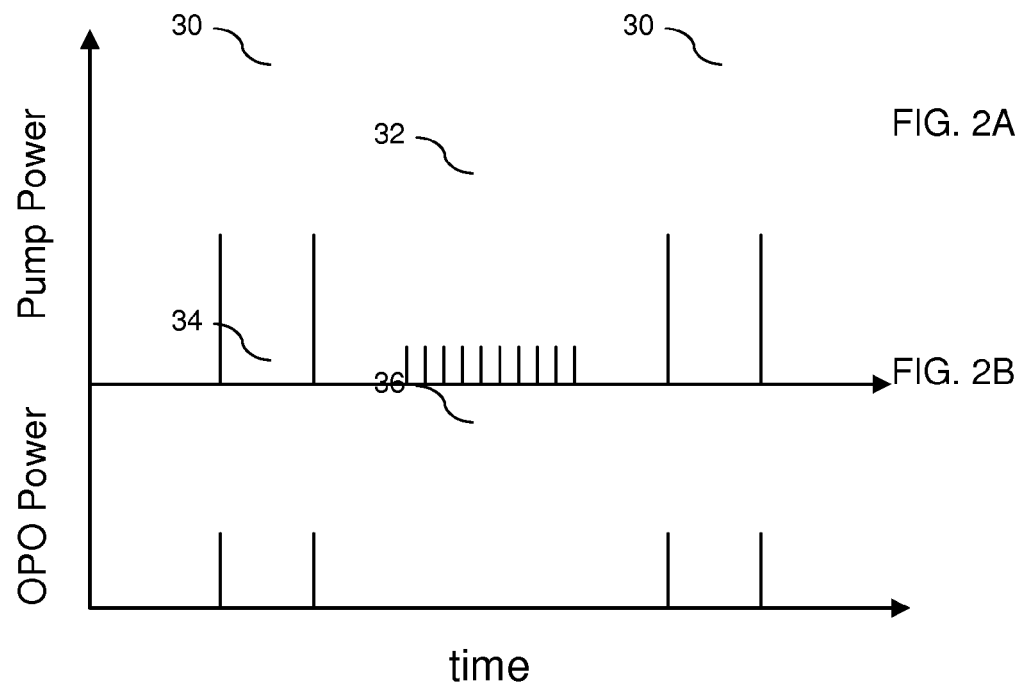
FIG. 2A
FIG. 2B
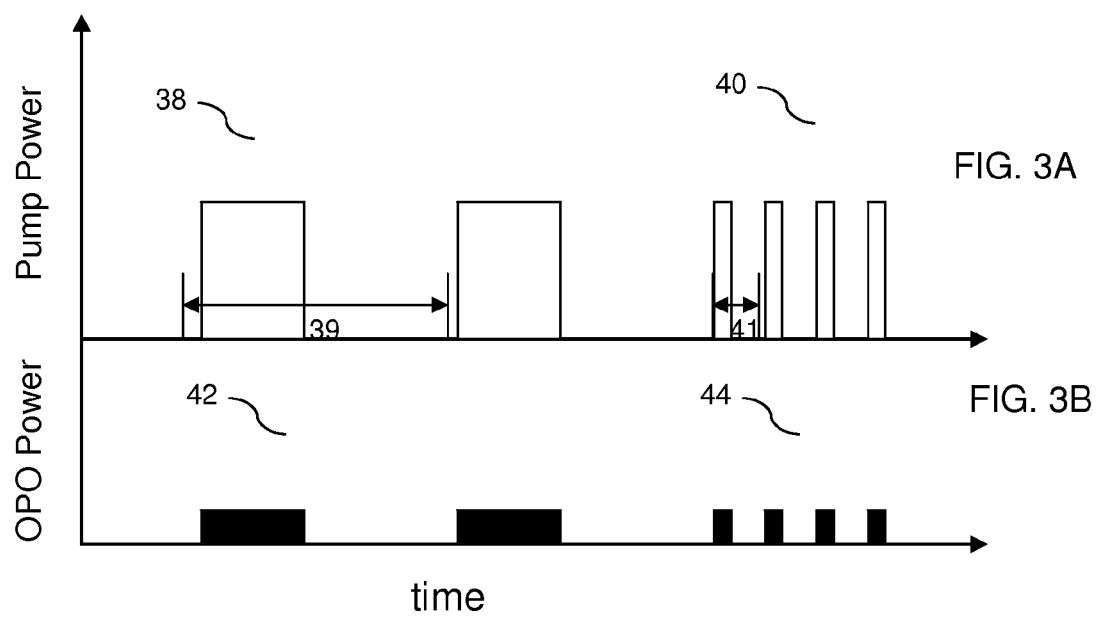
FIG. 3A
FIG. 3B

MODULATION OF FIBER LASER PUMPED DIFFERENCE FREQUENCY GENERATOR

FIELD OF THE INVENTION

The present invention relates to a system and method for modulation of an OPO by modulation of a fiber laser pump.

BACKGROUND OF THE INVENTION

Fiber lasers are used for producing high average power, high beam quality, high beam stability, and highly efficient sources of laser radiation. Production of light at 1, 1.5, and 2 μm can be performed using Yb, Er/Yb, and Tm:silica fibers, respectively. Other wavelengths can be obtained using Raman lasers (generally up to 2 μm in continuous wave operation) or by wavelength conversion using bulk crystals. Such wavelength conversion processes include harmonic, sum, and difference frequency generation. Harmonic generation is used to produce shorter wavelengths at multiples of the fundamental laser frequency. An example of harmonic generation is second harmonic generation (SHG) for producing green light (532 nm) from a 1064 nm Yb:silica fiber laser pump. Longer wavelengths are typically produced using difference frequency generation (DFG). More commonly, DFG is performed in a cavity to enhance the efficiency, i.e. in an optical parametric oscillator (OPO). OPOs are generally used to generate longer wavelengths from a shorter wavelength and can produce a broad range of wavelengths which are longer than the fiber laser pump source.

Multiple applications require high average power and high beam quality sources in the mid-infrared. In addition, such applications may also require modulation of output power or temporal characteristics. These applications include material processing (especially of glasses and plastics), spectroscopy of materials with mid-infrared signatures, remote sensing through the atmosphere, laser radar, free-space laser communications, medical applications, infrared countermeasures, and others.

These applications often require the ability to quickly modulate the output radiation. For example, in a material processing cutting application, the OPO output radiation needs to be turned on and off with short transition times and stability of output power. The OPO light can be directly modulated by external modulators, such as acousto-optic or electro-optic modulators. However, modulators in the mid-IR are not commonly available with low losses and fast transition times. The modulator itself adds to the complexity and cost of the system. In addition, if the power must be modulated externally to the laser generator, then there can be a large amount of wasted power, both optical and electrical, as the beam is continuously generated but not used.

There is thus a need for a system and method for modulation of OPO output without the use of external modulators and that can be done in the mid-IR range.

SUMMARY OF THE INVENTION

There is provided, in accordance with embodiments of the is present invention, a system for modulating the output of a difference frequency generator. The system includes a pump fiber laser having at least one internal, directly modulatible component, wherein the pump fiber laser produces a pump signal, and a difference frequency generator coupled to the pump fiber laser. The difference frequency generator is configured for accepting the pump signal of the pump fiber laser and producing an output signal, wherein parameters of the output signal are determined based on direct modulation of the internal, directly modulatible component of the pump fiber laser.

There is provided, in accordance with embodiments of the present invention, a method for modulating the output of a difference frequency generator. The method includes providing a pump fiber laser having at least one internal, directly modulatible component, modulating the internal, directly modulatible component, obtaining a pump signal from the modulated component of the pump fiber laser, providing the obtained pump signal to a difference frequency generator, and obtaining an output signal from the difference frequency generator, wherein parameters of said output signal are determined based on the modulation of the internal, directly modulatible component of the pump fiber laser.

In further embodiments of the present invention, the pump laser may be an "all-fiber" fiber laser or a hybrid fiber laser. The internal, directly modulatible component is at least one of: a power amplifier pump diode, an amplifier pump diode, or the oscillator. When the internal, directly modulatible component is an oscillator, the difference frequency generator output signal may have an "on" mode or an "off" mode, and the oscillator is modulatible by keeping average power of the pump fiber laser constant while providing an oscillator signal having an amplified peak power above a difference frequency generator threshold for the "on" mode and below the difference frequency generator threshold for the "off" mode. This may be accomplished by modulating at least one of: pulse duration, peak power, repetition rate, or pulse shape of the oscillator signal.

In additional embodiments, when the directly modulatible component is an oscillator, the difference frequency generator output signal may have a modified energy or repetition rate, and the oscillator is modulatible by keeping average power of the pump fiber laser constant while providing an oscillator signal having a modulated pulse energy or a modulated repetition rate.

In yet additional embodiments of the present invention, the pump fiber laser is a MOPA fiber laser, and the internal, directly modulatible component is either a power amplifier pump diode or an amplifier pump diode. The difference frequency generator produced output signal may be obtained by modulating the power amplifier pump diode while keeping the pump signal constant prior to its entry into the power amplifier pump diode. Alternatively, the difference frequency generator produced output signal may be obtained by modulating the amplifier pump diode.

In some embodiments, the internal, directly modulatible component may include two or more of: a power amplifier pump diode, an amplifier pump diode, or an oscillator. The difference frequency generator is at least one of: an OPO, an OPA or an OPG.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The above and further advantages of the present invention may be better understood by referring to the following description in conjunction with the accompanying drawings in which:

FIG. 2A is a graphical illustration of pump power with modulation of pulse sequences;

FIG. 2B is a graphical illustration of OPO power with the modulation of FIG. 2A;

FIG. 3A is a graphical illustration of pump power with modulation of pulse duration;

FIG. 3B is a graphical illustration of OPO power with the modulation of FIG. 3A;

Figure 1:
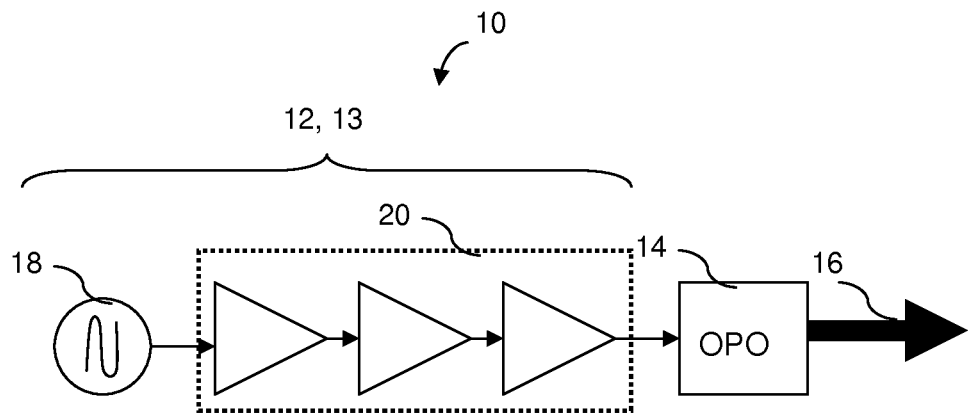
FIG. 1 is a schematic illustration of a system 10 for modulation of OPO output, in accordance with embodiments of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the present invention. It will be understood by those of ordinary skill in the art that the present invention may be practiced without these specific details. In other instances, well-known methods, procedures, components and structures may not have been described in detail so as not to obscure the present invention.

The present invention is directed to a system and method for modulating output of a difference frequency generator, such as an OPO, OPA or OPG. In addition, it should be understood that the same or similar method exists for harmonic generation, sum frequency generation, and any other nonlinear process driven by a fiber laser. The principles and operation of a system and method according to the present invention may be better understood with reference to the drawings and accompanying descriptions.

Before explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Reference is now made to FIG. 1, which is a schematic illustration of a system 10 for modulation of OPO output, in accordance with embodiments of the present invention. Generally, an OPO is pumped by a pulse from a pulse source. The pulse source may be, for example, a fiber laser or a Q-switched bulk laser. In the present invention, pulse source 12 is a fiber laser, and more specifically, a MOPA (master oscillator power amplifier) fiber laser 13. MOPA fiber laser 13 is used to pump an OPO 14. The use of a MOPA fiber laser allows for direct control over the output pump laser properties.

As shown in FIG. 1, MOPA fiber laser 13 includes a master oscillator 18 for providing a seed pulse and an amplifier 20. The seed pulse is sent to amplifier 20, which in some embodiments may comprise a string of amplifiers, as shown in FIG. 1. Master oscillator 18 may be a laser diode with or without an externally modulated switch, for example. Modulation of OPO output is done internally within MOPA fiber laser 13, as will be described in greater detail hereinbelow. Modulated output from MOPA fiber laser 13 is sent to OPO 14, resulting in IR radiation, as shown by arrow 16.

For the purposes of the present invention, the following terms are defined as follows:

"Pulse signal" is a pulse generated within a pulse source such as a MOPA fiber laser.

"Pulse parameter" refers to any parameter of the pulse signal itself, including, for example, pulse shape, pulse duration, pulse frequency, peak power, intensity, etc.;

"Pulse source component" refers to any physical component within the pulse source which is used to generate or to modify the pulse signal, for example, oscillators, diodes, amplifiers, modulators (e.g. electo-optic, acousto-optic, electro-absorption);

In embodiments of the present invention, modulation is done by modulating an internal, directly modulatible component of a pump fiber laser, and may include modulation of a pulse source component or a pulse parameter, as defined above.

Reference is now made to FIGS. 2A-2B and 3A-3B, which are graphical illustrations of examples of modulation of pulse parameters, in accordance with a first embodiment of the present invention. In this embodiment, modulating OPO output is done while keeping average output power of pulse source 12 constant. The main reason for keeping the laser output average power constant is to avoid transient behavior in the laser. If, for example, the pulse train to the amplifier chain is stopped and then restarted, the additional accumulated energy in the amplifier from the pump diodes will lead to a high energy pulse followed by a transient until steady state behavior is obtained. This high energy pulse may damage the laser or the OPO, which often works close to damage threshold to obtain high conversion efficiencies. Keeping the average power of the laser the same (over fractions of the gain media relaxation time) eliminates the transients allowing for fast switching times on the order of the pulse repletion rate. It is also advantageous to keep the peak power of the OPO constant in order to maximize conversion efficiency by the OPO design as in FIG. 3. Higher peak powers may lead to damage, whereas lower peak powers may lead to less efficient conversion. As shown in FIG. 2A, modulation of pulse parameters may be done by changing of pulse sequences. Thus, for example, one part of a sequence might include high peak power pulses 30 while another part of a sequence might include low peak power pulses 32. However, during the low peak power portion of the sequence, a high repetition rate will be used so as to keep average output power constant. An OPO will only convert pulses with intensities above the OPO threshold. Thus, by modulating the pulse sequences as in FIG. 2A, resulting OPO power will have an "on" state 34 for high peak power pulses and an "off" state 36 for low peak power pulses, as shown in FIG. 2B. This configuration provides short on/off transition times.

Modulation of the pulse duration is often times required by the application. For example, in a materials processing application high energy pulses may be used for ablating whereas low energy high repetition rate pulses may be used for welding. As shown in FIG. 3A, modulation of pulse parameters may be done by changing of pulse duration and the pulse spacing, or period. This method provides modulation of energy per pulse while keeping average power constant. Thus, for example, a pulse or series of pulses might have a long duration 38 while another pulse or series of pulses has a short duration 40. The long duration pulses may have longer periods 39—spaced further apart—while the short duration pulses have shorter periods 41, to keep average power of the pulse source constant. As shown in FIG. 3B, modulation of pulse duration and periods provides modulation of energy per pulse, and results in increased pulse energy 42 and decreased pulse energy 44 for OPO output.

Figure 4:
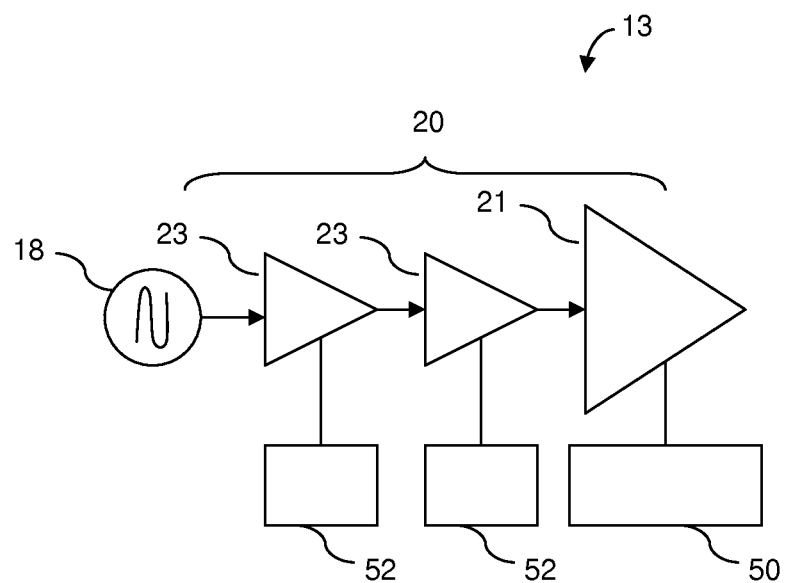
FIG. 4 is a schematic illustration of a MOPA fiber laser with pump diodes which can be used in the present invention.

Reference is now made to FIG. 4, which is a schematic illustration of a MOPA fiber laser 13 with pump diodes which can be used in the present invention. An example of modulating OPO output by direct modulation of components within pulse source 12 (MOPA fiber laser 13) is now described.

MOPA fiber laser 13 includes an oscillator 18 and an amplifier 20, wherein amplifier 20 may include a power amplifier 21 and one or several additional amplifiers 23. MOPA fiber laser 13 further typically includes at least one power amplifier pump diode 50 and at least one amplifier pump diode 52 for each of amplifiers 23. Modulation of components of MOPA fiber laser 13 can include modulation of oscillator 18, one or multiple power amplifier pump diodes 50 and/or one or multiple amplifier pump diodes 52.

Often times it is desired to conserve overall laser power, meaning that if there is not OPO output, the laser should be turned off. Most of the power consumption occurs in the pump diodes 50 of the power amplifier. Thus, modulating this diode directly may result in the desire OPO output characteristics while at the same time decreasing the laser overall power consumption, or increasing the electrical efficiency. However, modulating the pump diodes will result in slower transition times than modulating the oscillator and keeping the output power of the fiber laser constant.

Modulating the pump diode 50 results in modulation of the MOPA fiber laser output. The OPO thus may be turned off by bringing the output power of the MOPA fiber laser below the OPO threshold. By turning off the power amplifier pump diode 50, MOPA fiber laser 13 will be in an "off" state when no OPO output is required, thereby reducing overall power consumption and thermal load. However, as stated above, any of the pump diodes 52 or oscillator 18 may be modulated as well to achieve desired system performance parameters, such as minimum power consumption or rise time. Generally, fast rise and fall times may be achieved by modulating the pulse characteristics of the oscillator, as shown in FIG. 2. Modulating both the pump diodes 50 and the oscillator 18 may result in both a highly efficient laser source and fast transition times.

In summary, tailoring of the pump source output can be used to 1) modulate the OPO output with fast transition times, and 2) operate the OPO different pulse energies. More specifically, fiber laser modulation of the OPO allows for OPO modulation with no additional optical components. In addition, in low duty cycle applications, power savings can be obtained by only operating the pump source when OPO output is required.

EXAMPLE

Figure 5A:
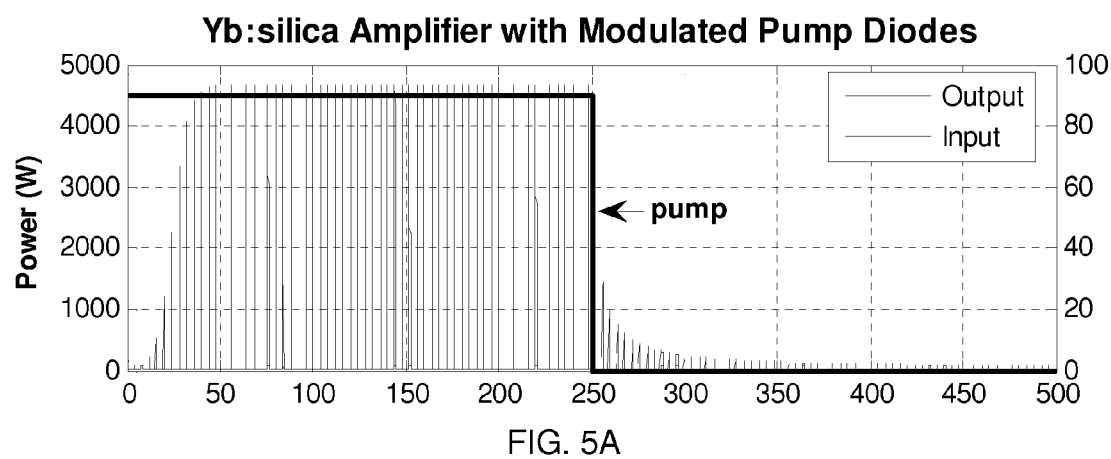
FIGS. 5A and 5B are graphical illustrations of output power and gain during a simulation.
Figure 5B:
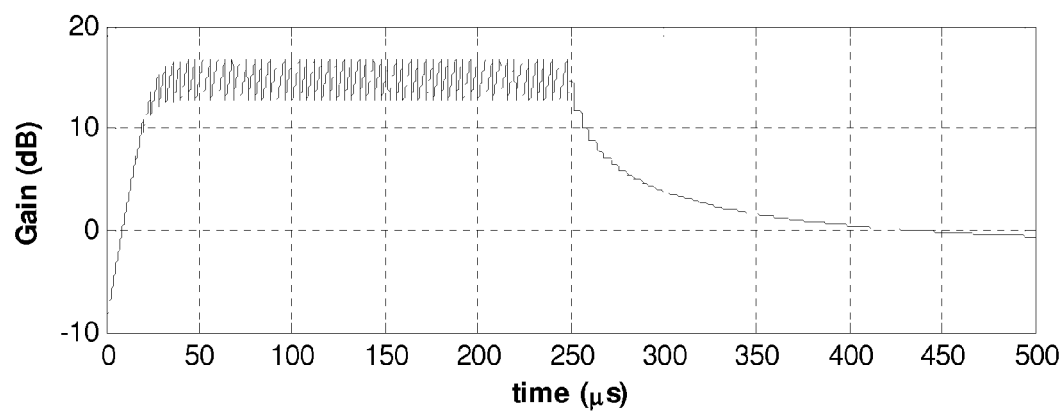

A simulation of a method of directly modulating power amplifier pump diode 50 was performed. A 50 W amplifier based on LMA-YDF-25/250 fiber (available from, for example, Nufern or Liekki) was pumped with 100 W of diode power at 915 nm. The input signal was a train of 100 ns pulses at 200 kHz repetition rate. The output power and gain are shown in FIGS. 5A and 5B, respectively. The pump was turned on at time zero and off at 250 µs. Full amplification was reached within 50 µs. After the pump was stopped, the pulses slowly trailed off.

Figure 6:
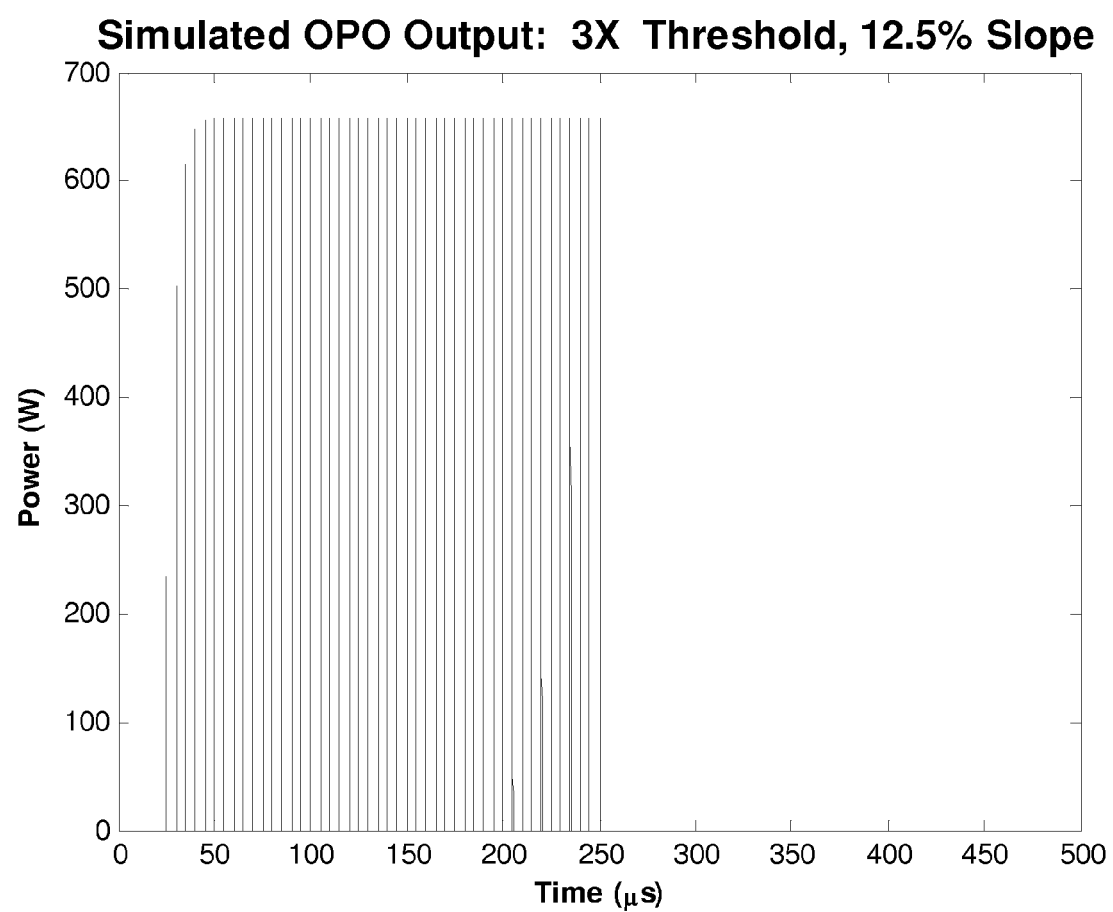
FIG. 6 is a graphical illustration of OPO output during the simulation of FIGS. 5A and 5B.

If this laser output is then sent to an OPO which operates at three times threshold with at 12.5% slope efficiency, then the output is shown in FIG. 6. The rise time and fall time of the OPO is much less than the rise time of the laser due to the thresholding effect of the OPO. If faster rise times are required, 1) the laser can be pumped harder thereby increasing the output power, 2) the input pulses can be turned off in order to obtain a faster inversion, or 3) the pulses from the oscillator can be modulated in such a way to allow for fast transition times, as in FIG. 2.

To conclude, these preliminary simulations indicate that fast OPO switching, rise and fall times <50 us, can be performed by modulating the pump diodes of the power amplifier of a MOPA chain. Such modulation will result in a power consumption reduction proportional to the duty cycle.

While certain features of the present invention have been illustrated and described herein, many modifications, substitutions, changes, and equivalents may occur to those of ordinary skill in the art. It is, therefore, to be understood that the appended claims are intended to cover all such modifications and changes as fall within the true spirit of the present invention.

The invention claimed is:

1. A system comprising:
   a fiber laser comprising:
      a master oscillator configured to generate a seed pulses; and
      a string of amplifiers configured to receive said seed pulses and produce a pump signal; and
   an optical parametric oscillator (OPO) coupled to the fiber laser,
   wherein the OPO is configured to receive the pump signal and produce an output pulse train,
   wherein the OPO is further configured to only convert pump signals with intensities above a predefined OPO threshold,
   wherein an internal component of the fiber laser is used for modulating the pump signal, and
   wherein the pump signal is used to modulate the OPO output pulse train.

2. The system of claim 1, wherein said pump fiber laser is at least one of: an "all-fiber" fiber laser or a hybrid fiber laser.

3. The system of claim 1, wherein said at least one internal, directly modulatable component is at least one of: a power amplifier pump diode, an amplifier pump diode, or an oscillator.

4. The system of claim 3, wherein said at least one internal, directly modulatable component is an oscillator, and wherein said difference frequency generator output signal comprises an "on" mode or an "off" mode, and wherein said oscillator is modulatable by keeping average power of said pump fiber laser constant while providing an oscillator signal having an amplified peak power above a difference frequency generator threshold for said "on" mode and below said difference frequency generator threshold for said "off" mode.

5. The system of claim 4, wherein said provided oscillator signal is obtained by modulating at least one of: pulse duration, peak power, repetition rate, or pulse shape of said oscillator signal.

6. The system of claim 3, wherein said at least one internal, directly modulatable component is an oscillator, and wherein said difference frequency generator output signal comprises a modified energy or repetition rate, and wherein said oscillator is modulatable by keeping average power of said pump fiber laser constant while providing an oscillator signal having a modulated pulse energy or a modulated repetition rate.

7. The system of claim 3, wherein said pump fiber laser is a MOPA fiber laser, and wherein said at least one internal, directly modulatable component is a power amplifier pump diode, and wherein said difference frequency generator produced output signal is obtained by modulating said power amplifier pump diode while keeping said pump signal constant prior to its entry into said power amplifier pump diode.

8. The system of claim 3, wherein said pump fiber laser is a MOPA fiber laser, and wherein said at least one internal, directly modulatable component is an amplifier pump diode, and wherein said difference frequency generator produced output signal is obtained by modulating said amplifier pump diode.

9. The system of claim 3, wherein said at least one internal, directly modulatable component is two or more of: a power amplifier pump diode, an amplifier pump diode, or an oscillator.

10. A method comprising:
generating a seed pump by a master oscillator;
providing a fiber laser comprising a string of amplifiers and an optical parametric oscillator (OPO) coupled to the fiber laser;
producing a pump signal by the fiber laser responsive to receiving said seed pulse and;
producing an output pulse train at the OPO in response to the pump signal, wherein the OPO is further configured to only convert pump signals with intensities above a predefined OPO threshold,
wherein an internal component of the fiber laser is used for modulating the pump signal, and
wherein the pump signal is used to modulate the OPO output pulse train.

11. The method of claim 10, wherein said providing a pump fiber laser comprises providing at least one of: an "all-fiber" fiber laser or a hybrid fiber laser.

12. The method of claim 10, wherein said modulating at least one internal, directly modulatable component comprises modulating at least one of: a power amplifier pump diode, an amplifier pump diode, or an oscillator.

13. The method of claim 12, wherein said modulating comprises modulating an oscillator, and wherein said difference frequency generator output signal comprises an "on" mode or an "off" mode, and wherein said modulating is done by keeping average power of said pump fiber laser constant while providing an oscillator signal having an amplified peak power above a difference frequency generator threshold for said "on" mode and below said difference frequency generator threshold for said "off" mode.

14. The method of claim 13, wherein said providing said oscillator signal is obtained by modulating at least one of: pulse duration, peak power, repetition rate, or pulse shape of said oscillator signal.

15. The method of claim 12, wherein said modulating comprises modulating an oscillator, and wherein said difference frequency generator output signal comprises a modified energy or repetition rate, and wherein said modulating said oscillator is done by keeping average power of said pump fiber laser constant while providing an oscillator signal having a modulated pulse energy or a modulated repetition rate.

16. The method of claim 12, wherein said pump fiber laser is a MOPA fiber laser, and wherein said modulating at least one internal, directly modulatable component comprises modulating a power amplifier pump diode, and wherein said difference frequency generator produced output signal is obtained by modulating said power amplifier pump diode while keeping said pump signal constant prior to its entry into said power amplifier pump diode.

17. The method of claim 12, wherein said pump fiber laser is a MOPA fiber laser, and wherein said modulating said at least one internal, directly modulatable component comprises modulating an amplifier pump diode.

18. The method of claim 12, wherein said modulating at least one internal, directly modulatable component comprises modulating two or more of: a power amplifier pump diode, an amplifier pump diode, or an oscillator.

* * * * *